United States Patent [19]
Hagerman

[11] Patent Number: 5,793,441
[45] Date of Patent: Aug. 11, 1998

[54] METHOD AND APPARATUS FOR MEASURING ILLUMINATION UNIFORMITY OF A LIQUID CRYSTAL LIGHT VALVE PROJECTOR

[75] Inventor: James G. Hagerman, San Diego, Calif.

[73] Assignee: Hughes-JVC Technology Corporation, Carlsbad, Calif.

[21] Appl. No.: 532,998

[22] Filed: Sep. 25, 1995

Related U.S. Application Data

[63] Continuation-in-part of Ser. No. 481,768, Jun. 7, 1995, abandoned.

[51] Int. Cl.[6] .................................................. H04N 5/73
[52] U.S. Cl. ............................................ 348/658; 345/147
[58] Field of Search .................................. 345/87–89, 904, 345/50, 132, 147; 348/658, 687; 349/5–8

[56] References Cited

U.S. PATENT DOCUMENTS

| | | | |
|---|---|---|---|
| 4,700,218 | 10/1987 | Thomsen et al. | 348/658 |
| 4,962,418 | 10/1990 | Kamaga | 348/658 |
| 5,181,103 | 1/1993 | Tatsuya | 348/658 |
| 5,231,481 | 7/1993 | Eouzan et al. | 348/658 |
| 5,315,378 | 5/1994 | Satou et al. | 348/675 |
| 5,416,385 | 5/1995 | Hau | 315/758 |
| 5,530,489 | 6/1996 | Henderson et al. | 348/757 |
| 5,537,145 | 7/1996 | Miseli | 345/904 |

*Primary Examiner*—Mark R. Powell
*Attorney, Agent, or Firm*—Harness, Dickey & Pierce, P.L.C.

[57] ABSTRACT

A system for measuring the illumination uniformity of a liquid light value (LCLV) for a LCLV projector includes a projection device including a first LCLV. The projection device reflects light from the first LCLV to form an image on a screen. An image sensing device senses illumination values for a plurality portions of said image. A processor is coupled to the image sensing device and the projection device. The processor determines an optimum voltage bias which provides a maximum illumination for the plurality of image pixels. The illumination uniformity measuring system can independently measure the illumination non-uniformity of the LCLV and illumination non-uniformity resulting from other sources such as projection lens roll-off, screen gain, and other illumination non-uniformities. Using the measured illumination non-uniformity, a correction system can improve the quality of the displayed image.

24 Claims, 5 Drawing Sheets

METHOD AND APPARATUS FOR MEASURING ILLUMINATION UNIFORMITY OF A LIQUID CRYSTAL LIGHT VALVE PROJECTOR

CROSS REFERENCE TO RELATED APPLICATIONS

This application is a continuation-in-part of U.S. application Ser. No. 08/481,768, filed Jun. 7, 1995 now abandoned.

BACKGROUND OF THE INVENTION

1. Technical Field

This invention relates to projectors and, more particularly, the measurement of illumination uniformity of liquid crystal light valve projectors.

2. Discussion

Image light amplifiers or liquid crystal light valves (LCLV) are imaging devices whose light transmission or reflection can be varied in accordance with an externally applied quantity such as voltage, current and/or light. One or more LCLVs are conventionally employed in LCLV projection systems. For example, in color LCLV projectors three LCLV are used, one for green light, one for red light, and one for blue light. The three colors of light are mixed by the three LCLV to generate other colors and to form a displayed image on a screen.

In a reflective LCLV color projector, a reading light is separated by one or more dichroic mirrors. The reading light is divided by the dichroic mirror(s) into red, green and blue light which is directed onto one side of a first, second and third LCLV, respectively. First, second and third writing lights are directed onto an opposite side of the first, second and third LCLV. The writing light modulates the reflection of light from each of the first, second and third LCLV like a variable mirror. Portions of each LCLV illuminated by the writing light reflect the reading light and change the polarization. Other portions of each LCLV not illuminated by the writing light are reflected without a change of polarization. The light reflected by the LCLV is directed through the dichroic mirrors to the polarization analyzer which discards light which does not have the change in polarization and transmits light having the change in polarization through a projection lens and onto a screen.

Reflective LCLVs are typically made from multiple layers of thin film. The layers are difficult to fabricate homogeneously and with a uniform thickness. Because one or more of the thin film layers generally has a non-uniform thickness and/or is non-homogenous, the LCLV light transfer function, which describes output light as a function of input light, is also generally non-uniform. In other words, as a result of the non-uniform thickness and/or the non-homogenous make-up of the layers, the LCLV light transfer function is not constant across the surface of the LCLV. The non-constant LCLV light transfer function causes undesirable non-uniformities, such as grey scale or color shading errors, in a displayed image.

One way of detecting the LCLV light transfer function is to examine a displayed image reflected by one or more LCLVs onto a screen. Before attempting to determine the LCLV light transfer function by analyzing the displayed image, additional sources of illumination non-uniformity must be accounted for, such as projection lens roll-off, projection angle relative to the screen, screen gain, and other sources of illumination non-uniformity. Preferably the non-uniformity of the LCLV light transfer function is measured and corrected without any degradation from these other sources of illumination non-uniformity.

In other words, illumination uniformity of the displayed image is a combined function of the non-uniformity of the LCLV light transfer function and the other sources of illumination non-uniformity. The non-uniformity of the LCLV light transfer function cannot be independently determined without first knowing the contribution due to the other sources of illumination non-uniformity.

Conventional methods of detecting the other sources of illumination non-uniformity include "perfect" LCLV which are mirrors that are temporarily installed in the projector as a replacement for the LCLV. The manual installation procedure requires the LCLV projector to be taken out of service, is time consuming, requires a skilled technician, and is prone to measurement errors, for example due to faulty installation of the "perfect" LCLV. Once the other sources of illumination non-uniformity are determined, a correction signal can be applied to cancel out the other sources of illumination non-uniformity. Then, the illumination non-uniformity due to the LCLV light transfer function(s) can be measured and corrected.

Therefore, a simplified and improved method of and apparatus for measuring the illumination uniformity of an LCLV projector is desirable.

SUMMARY OF THE INVENTION

A method of measuring the illumination uniformity of a liquid crystal light valve (LCLV) of a projector according to the present invention includes the steps of: a) reflecting light from said LCLV to form an image on a screen, b) sensing an illumination value for a plurality of portions of said image using an image sensing device, and c) determining an optimum voltage bias which provides a maximum illumination for said plurality of portions of said image.

According to another feature of the invention, the method further includes the step of repeating steps a) through c) for a plurality of LCLV each associated with a distinct color of light.

According to another feature of the invention, the method further includes the step of initializing a voltage bias value, an old illumination value and a new illumination value associated with at least one portion of said image.

According to another feature of the invention, the method further includes the steps of incrementing said voltage bias value, measuring a new illumination value for said voltage bias, comparing said new illumination value to said old illumination value, and setting said old illumination value equal to said new illumination value if said new illumination value exceeds said old illumination value.

A system for measuring the illumination uniformity of a liquid crystal light valve (LCLV) for a LCLV projector according to another aspect of the invention includes a projection means, including a first LCLV, for reflecting light from said first LCLV to form an image on a screen. An image sensing means senses an illumination value for a plurality of portions of said image. A processing means, coupled to said image sensing means and said projection means, determines an optimum voltage bias which provides a maximum illumination for said plurality of portions of said image.

According to another feature of the invention, the system further includes a pointing means, associated with said processing means, for sequentially selecting each of said plurality of portions of said image.

According to another feature of the invention, the projection means further includes a plurality of LCLV each associated with a distinct color of light.

According to another feature of the invention, the system further includes a LCLV pointing means, associated with said processing means, for sequentially identifying each of said plurality of LCLV.

According to another feature of the invention, the system further includes a voltage setting means for successively incrementing a voltage bias on said first LCLV, wherein said image sensing means measures a new illumination value corresponding to said voltage bias.

According to another feature of the invention, the processing means includes optimum locating means for identifying, for each portion of said image, a maximum illumination value.

According to another feature of the invention, the image sensing means includes a charge coupled device camera directed at said screen.

A system for measuring the illumination uniformity of a liquid crystal light valve (LCLV) for a LCLV projector according to still another aspect of the invention includes a projection means, including a first LCLV, for projecting light which is modulated by said first LCLV to produce an image on a screen. An image sensing means senses an illumination value for a plurality of portions of said image. At least one processor, coupled to said image sensing means and said projection means, has a control means for effecting an illumination uniformity measuring procedure that identifies a maximum illumination for at least one of said plurality of portions of said image.

Other objects, features and advantages will be readily apparent.

BRIEF DESCRIPTION OF THE DRAWINGS

The various advantages of the present invention will become apparent to those skilled in the art after studying the following specification and by reference to the drawings in which.

DETAILED DESCRIPTION

Projectors typically employ image light amplifiers or liquid crystal light valves (LCLV) as imaging devices. The LCLV are made from many layers of thin film which are difficult to fabricate homogeneously and with uniform thickness. Since some of the layers of the thin film have non-uniform thickness and/or are non-homogenous, the LCLV light transfer function, which describes output light as a function of input light, is non-uniform. In other words, the LCLV light transfer function is not constant across the surface of the LCLV and undesirable illumination non-uniformities in the displayed image occur.

Figure 1:
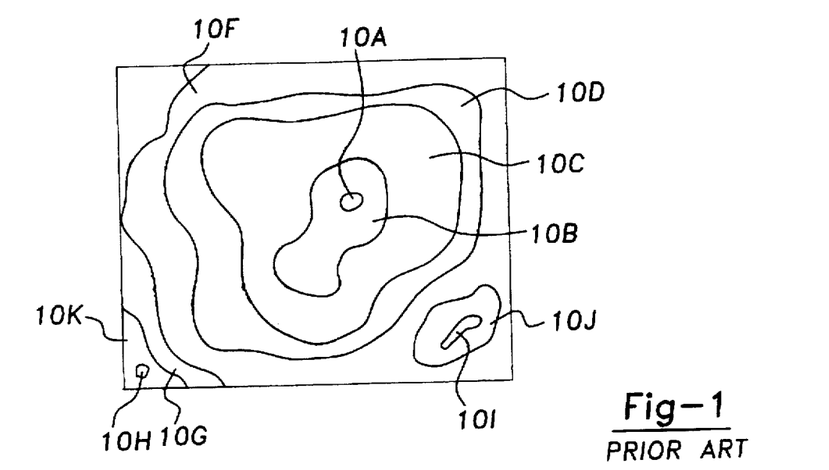
FIG. 1 illustrates illumination non-uniformity of a projector.

FIG. 1 illustrates screen areas 10A–10D and 10F–10J having different illumination values. For example, screen area 10A has the maximum measured illumination value, screen area 10H has the minimum measured illumination value, and the remaining screen areas 10B–10C 10D–10F, 10G–10I and 10J have intermediate measured illumination values. As can be appreciated, the non-uniform illumination values affect image quality of the displayed image.

According to the present invention, an image sensing device is directed at the screen to measure illumination values of the displayed image on a screen. Preferably the image sensing device divides the displayed image into a plurality of sensed portions or regions. The number of sensed portions depends on the resolution of the image sensing device. The portions are preferably uniform in size and shape. In a highly preferred embodiment, the image sensing device pixellates the measured illumination values.

Figure 2A:
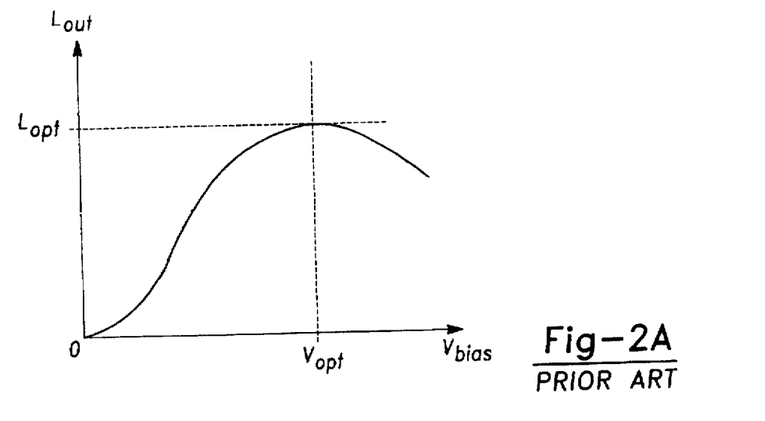
FIG. 2A illustrates a light transfer function of one portion of a liquid crystal light valve (LCLV)

FIG. 2A illustrates a LCLV light transfer function associated with one of the uniform sensed portions as measured by the image sensing device. As a bias voltage $V_{bias}$ on a LCLV driver is increased, the illumination $L_{out}$ increases to a maximum illumination $L_{opt}$ at a corresponding optimum voltage $V_{opt}$. When the bias voltage $V_{bias}$ is increased higher than the optimum voltage $V_{opt}$, the LCLV turns on and the illumination decreases for increasing voltages. For voltages near $V_{opt}$, the transfer function is relatively flat and broad.

In order to approximate a "perfect" LCLV, the measured illumination values for each uniform sensed portion must be maximized. However, the reflective LCLV typically includes only a single voltage bias input for the entire LCLV. In other words, the LCLV does not have a matrix input for separately addressing separate portions of the LCLV to control illumination values of each sensed portion of the image.

Figure 2B:
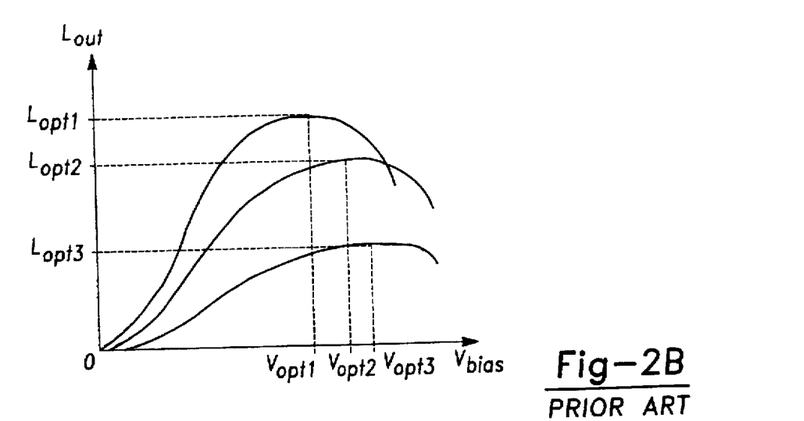
FIG. 2B illustrates light transfer functions for three portions of a LCLV color projector.

FIG. 2B illustrates transfer functions for three areas associated with a color LCLV projector. The color LCLV projector preferably employs three LCLVs, one for each of the three primary colors. Each of the three LCLVs has its own LCLV light transfer function for each sensed portion or pixel as measured by the image sensing device. As can be appreciated, each sensed portion or pixel as measured by the image sensing device has its own $L_{opt}$. Unless corrected, the differences in the LCLV light transfer functions will manifest themselves as color shading or grey scale errors which vary across the surface of the LCLV or projected image. In other words, the LCLV light transfer functions of other sensed portions or pixels will not be the same as the LCLV light transfer functions in FIG. 2B. As a result, the color of the displayed image will be distorted.

In the method of and apparatus for measuring the illumination uniformity according to the present invention, a voltage bias $V_{bias}$ on each LCLV is increased. As the voltage bias $V_{bias}$ is increased from zero, the optimum illumination $L_{opt}$ for each sensed portion or pixel is identified. In a preferred embodiment, the LCLV has only one voltage input. As the voltage bias $V_{bias}$ is increased, the optimum illumination $L_{opt}$ is simultaneously measured for each sensed portion or pixel. After being identified, the optimum illumination $L_{opt}$ is stored in memory for each sensed portion or pixel of the displayed image.

Figure 3:
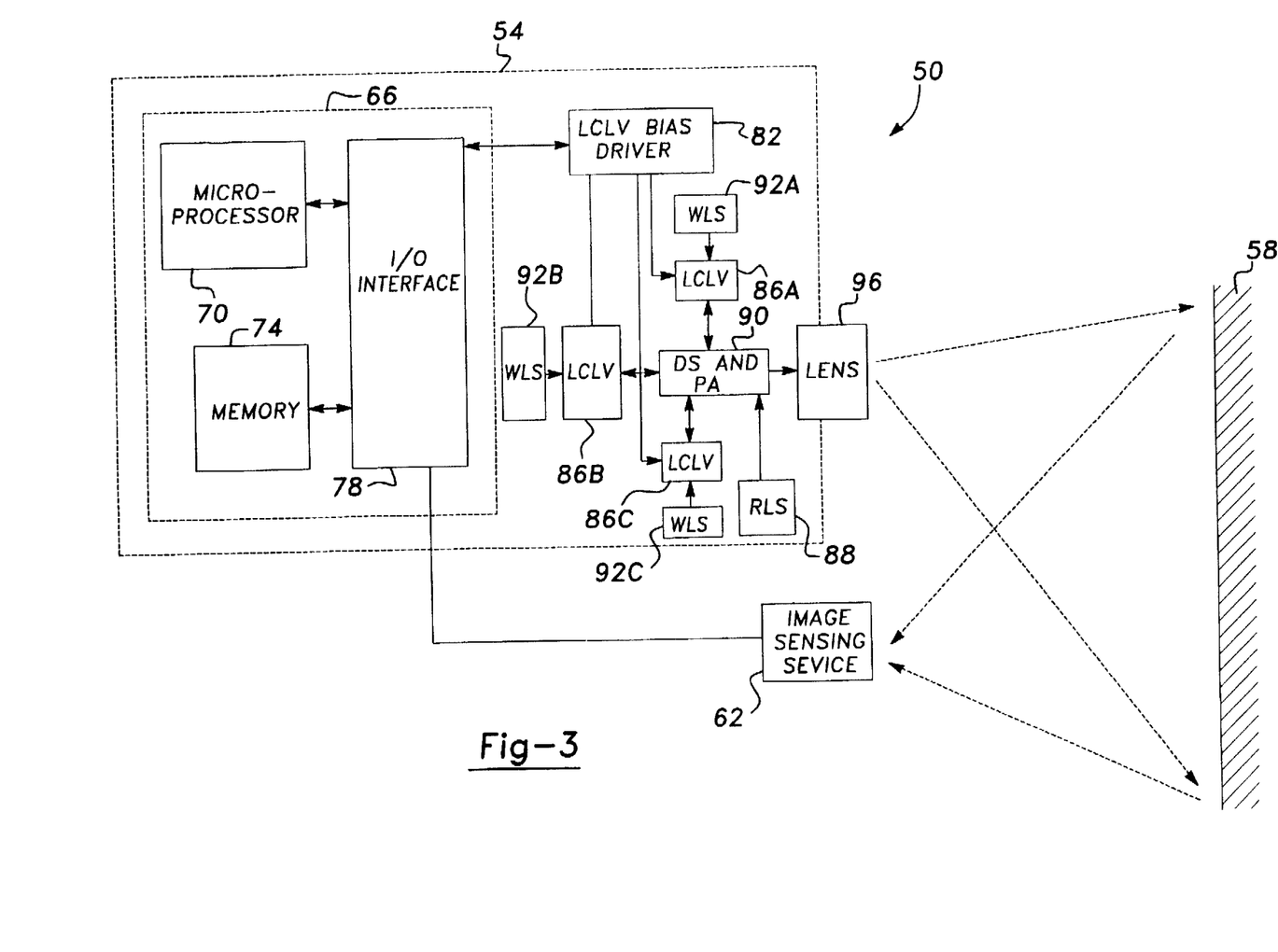
FIG. 3 is an electrical schematic of an illumination uniformity measuring device according to the present invention.

In FIG. 3, illumination uniformity measuring device 50 is illustrated and includes a LCLV projector 54 which projects an image onto a screen 58 and an image sensing device 62 for measuring portions or pixels of the displayed image. Image sensing device 62 may be a charge couple device camera. LCLV projector 54 includes a central processing unit 66 with a microprocessor 70, memory 74, and an input/output (I/O) interface 78. LCLV projector 54 further includes a LCLV voltage bias driver 82 and one or more LCLV 86A, 86B, 86C. LCLV projector 54 further includes a reading light source 88 directed at a dichroic separator and polarization analyzer 90. LCLV projector 54 includes one or more writing light sources 92A, 92B and 92C and a lens 96. One such projection system is disclosed in "Single Projection Lens Color Projection System", U.S. application Ser. No. 08/318,532 which is commonly assigned herewith and which is hereby incorporated by reference.

The central processing unit 66, through the use of microprocessor 70, memory 74, and I/O interface 78, performs the functions: sequentially identifying each of a plurality of image pixels; sequentially identifying each of a plurality of LCLV; successively incrementing a new voltage bias value; setting an old illumination value equal to a new illumination value and an old voltage bias equal to a new voltage bias; measuring a new illumination value when said means for incrementing a new voltage bias value increments the new voltage bias; of comparing the new illumination value to the old illumination value; and storing an optimum voltage bias and a maximum illumination value equal to the old illumination value. As shown in FIG. 3, central processing unit 66 is in communication with LCLV bias driver 82 (by way of interface 78). As central processing unit 66 successively increments a new voltage bias value, driver 82 increments the voltage bias accordingly.

In use, light from reading light source 88 which provides light of a first polarization is directed onto dichroic separator and polarization analyzer 90 which separates the reading light into first, second and third colors of light. The first, second and third colors of light are directed onto one side of LCLVs 86A, 86B and 86C. Writing light sources 92A, 92B and 92C illuminate an opposite side of LCLVs 86A, 86B and 86C, respectively.

Each LCLV acts as a variable mirror. Where the writing light source 92 is "light", the LCLV reflects the reading light and changes the first polarization to a second polarization. Where the writing light source 92 is "dark", the reading light is reflected without a change in polarization from the first polarization. The dichroic separator and polarization analyzer 90 discards light of the first polarization and transmits light of the second polarization to the lens 96 to form an image.

LCLV bias driver 82 is coupled to each LCLV. As can be appreciated, the voltage bias $V_{bias}$ on LCLV controls the reflection of the reading light from the surface of the LCLV. With no voltage bias $V_{bias}$, the LCLV reflects light without changing the polarization. As a voltage bias $V_{bias}$ is applied, the LCLV increasingly reflects the reading light and changes the polarization. In effect, by increasing the voltage bias $V_{bias}$ up to an optimum value, the LCLV increases the illumination.

Figure 4:
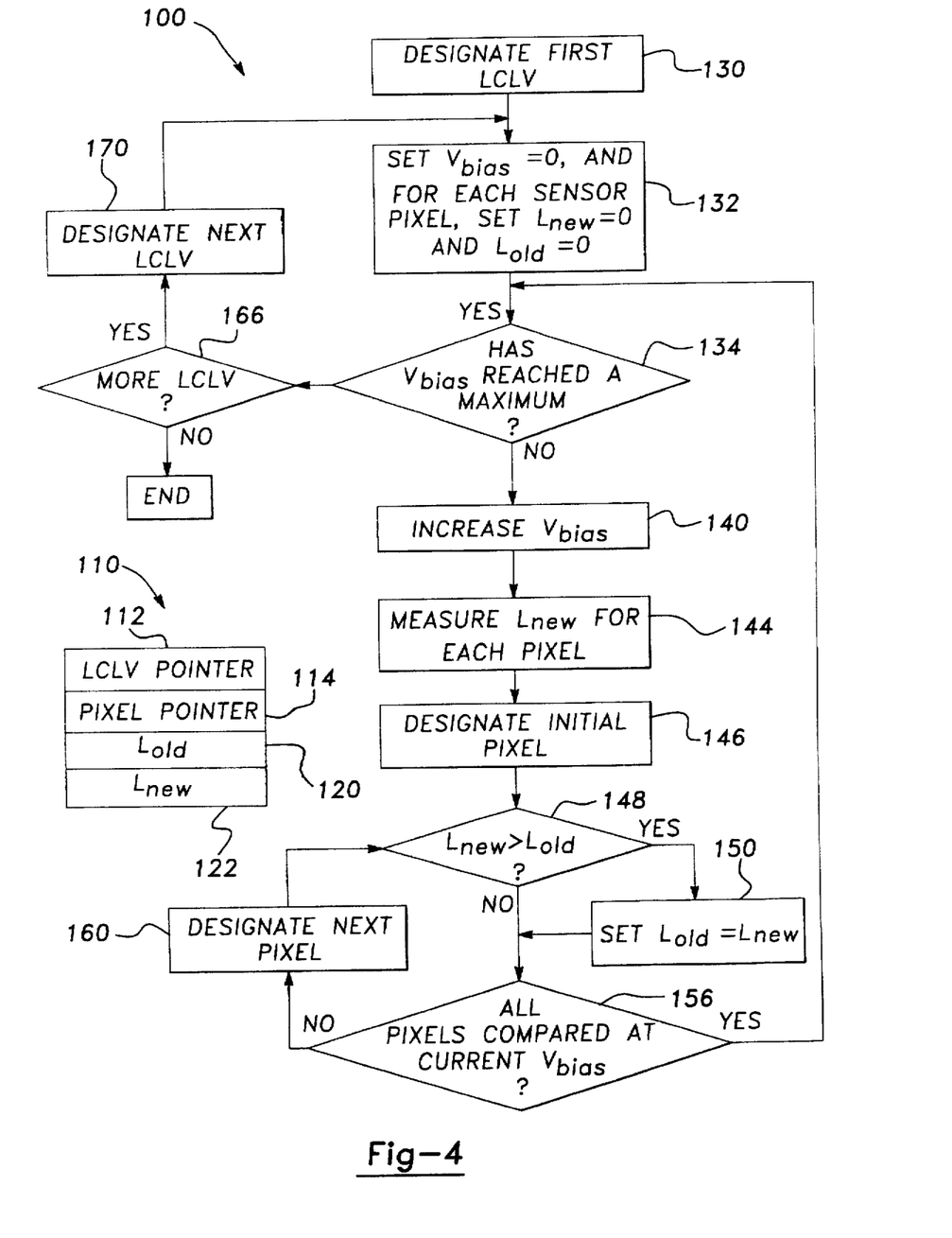
FIG. 4 is a flow chart illustrating an illumination uniformity procedure executed by the illumination uniformity measuring device of FIG. 3 and its associated data structure.

FIG. 4 illustrates an illumination uniformity procedure 100 executed by the illumination uniformity measuring device 50 illustrated in FIG. 3 and its associated data structure 110 which includes a LCLV pointer 112 (which designates a current LCLV), a pixel pointer 114 (designating a current pixel of the current LCLV), an old illumination ($L_{old}$) variable 120 (for an illumination value corresponding to a previous voltage bias of each pixel), and a new illumination ($L_{new}$) variable 122 (for an illumination value corresponding to a new bias voltage of each pixel).

Illumination uniformity procedure 100 begins at step 130 where the first LCLV is designated, preferably using LCLV pointer 112. For example, projector 54 is preferably a color projector with three LCLVs. At step 130, one of the three LCLVs is selected. As step 132, the variables $L_{new}$ and $L_{opt}$ are set equal to zero for each sensor portion or pixel and the voltage bias is set to zero. At step 134, central processing unit 66 determines whether $V_{bias}$ has reached a maximum. Step 134 checks to see whether the illumination uniformity procedure is completed for the designated LCLV. If $V_{bias}$ is less than the maximum, central processing unit 66 continues with step 140.

At step 140, the voltage bias $V_{bias}$ across the LCLV is increased. At step 144, the image sensing device 62 measures a new illumination $L_{new}$ for each portion or pixel sensed by the image sensing device. At step 148, an initial portion or pixel sensed by the image sensing device is designated using pixel pointer 114. At step 148, central processing unit 66 compares the old illumination $L_{old}$ with the new illumination $L_{new}$ as sensed by the image sensing device. If $L_{new}$ exceeds $L_{old}$, central processing unit 66 continues with step 150. At step 150, $L_{old}$ is set equal to $L_{new}$. If $L_{new}$ is not greater than $L_{old}$ as determined at step 148, central processing unit 66 proceeds with step 156. At step 156, central processing unit 66 determines whether all of the portions or pixels of the current LCLV have been compared at the current $V_{bias}$. If not, central processing unit 66 designates a next portion or pixel at step 160 and loops to step 148. If all portions or pixels have been compared at the current bias voltage, central processing unit 66 returns to step 134.

When $V_{bias}$ reaches a maximum, as determined at step 134, central processing unit 66 proceeds with step 166. At step 166, central processing unit 66 determines whether additional LCLV require measurement. If yes, central processing unit 66 designates a new LCLV at step 170 and central processing unit 66 loops to step 132. If not, central processing unit 66 ends.

As can be appreciated from FIG. 4, the voltage bias $V_{bias}$ on the LCLV is incrementally increased from zero. As the voltage bias $V_{bias}$ on the LCLV is incremented, central processing unit 66 determines the optimum illumination $L_{opt}$ for each portion or pixel simultaneously. After a portion or pixel reaches its maximum value corresponding to the optimum illumination, the comparison at step 148 is not met for increased $V_{bias}$ and central processing unit 66 stores the optimum illumination. Central processing unit 66 continues until $V_{bias}$ reaches a maximum value. If yes, then all of the sensor portions or pixels have stored optimum illumination values. Then, central processing unit 66 continues with the next LCLV until all LCLVs have been measured.

Figures 5, 6:
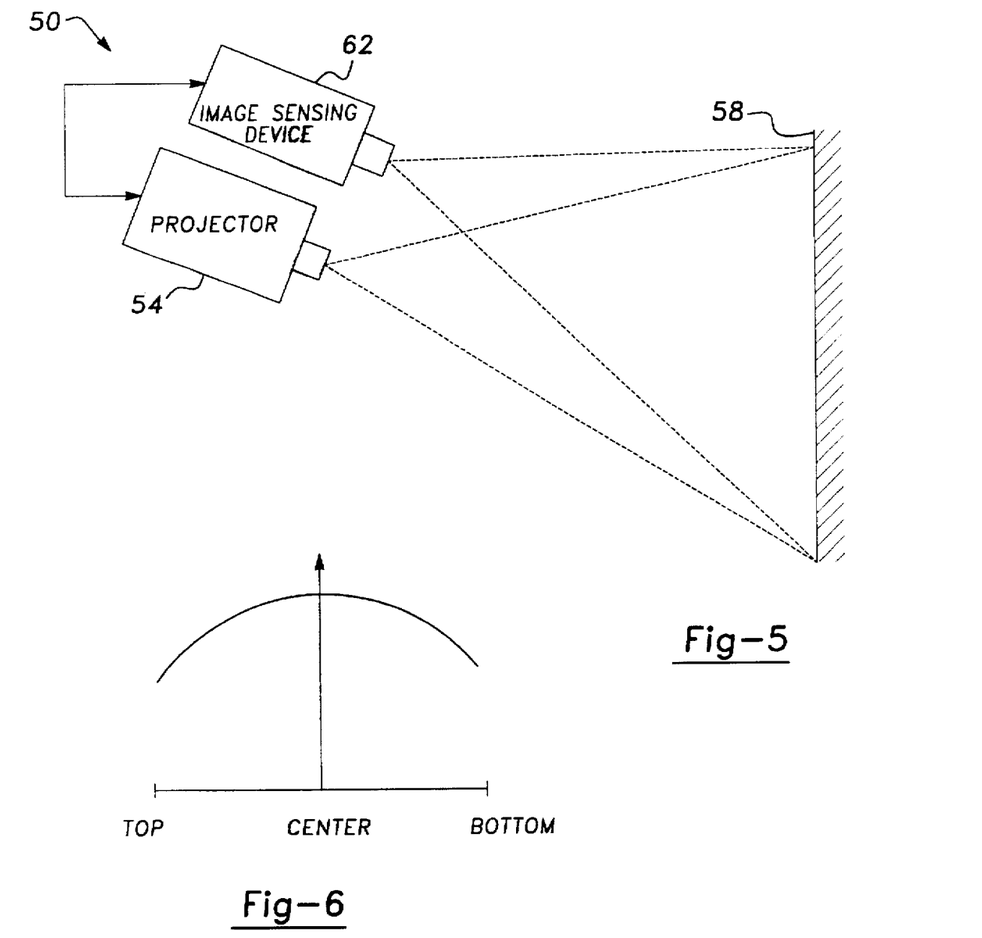
FIG. 5 illustrates one possible physical location for the illumination uniformity measuring device of FIG. 3 relative to a screen.
FIG. 6 illustrates an illumination field of a light source used in the LCLV projector.

As can be appreciated, some of the other sources of illumination non-uniformity are affected by the position of screen 58 relative to projector 54 and image sensing device 62. In FIG. 5, a typical physical location of illumination uniformity measuring device 50 is illustrated. Both projector 54 and image sensing device 62 are located above a center line perpendicular to screen 58. Typically light source 88 of projector 54 does not have a perfectly flat illumination field. The illumination is typically strongest in the center of the light source and rolls-off at the corners. A projection lens generally has a similar roll-off of uniformity as depicted in FIG. 6.

Figure 7:
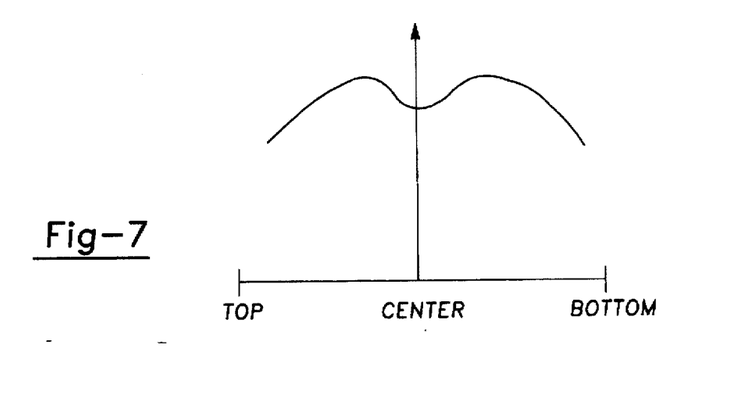
FIG. 7 illustrates a screen having non-monotonic gain.
Figure 8:
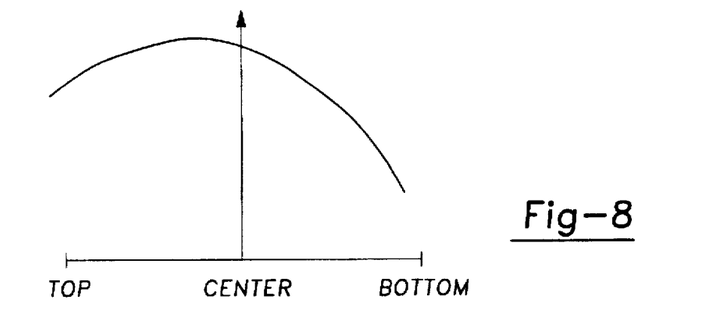
FIG. 8 illustrates changes in illumination resulting from off-center positioning of the LCLV projector and image sensing device in the physical location illustrated in FIG. 5.

Other sources of illumination non-uniformity include screen gain which can be from one to three or even higher. Screen gain is not always monotonic and can appear as in FIG. 7. If the projector 54 and image sensing device 62 are tilted relative to the screen 58, as in FIG. 5, the "hot spot" moves away from the center of the screen. For example in the configuration shown in FIG. 5, the "hot spot" moves away from center towards the top of the screen as illustrated in FIG. 8. Both the projector 54 and image sensing device 62 are closer to a top portion of the screen 58. In addition, trapezoidal correction of the displayed image in FIG. 5 may be required so that the displayed image appears rectangular on screen 58.

Figure 9:
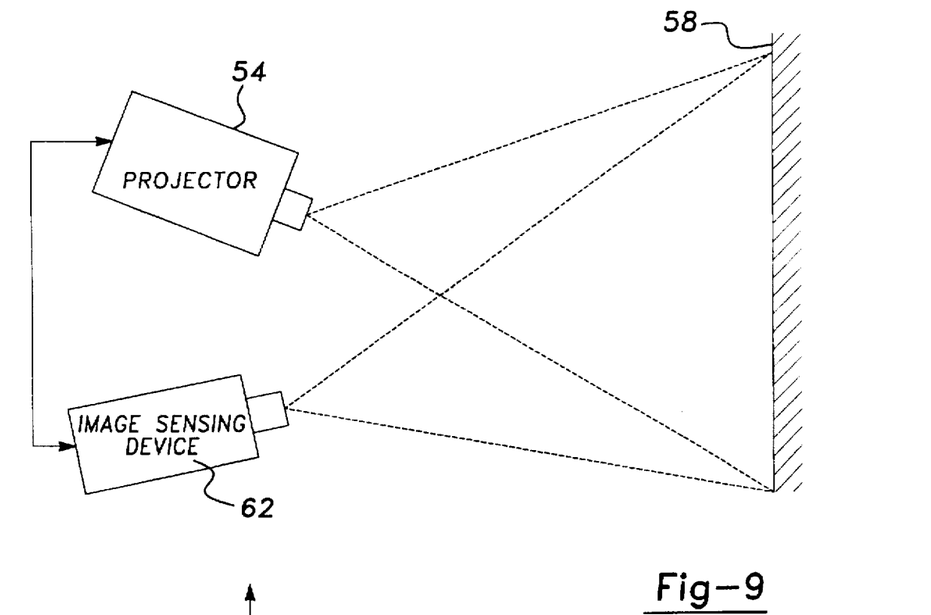
FIG. 9 illustrates another possible physical location of the image uniformity measuring device with the LCLV projector and image sensing device located on opposite sides of a center line which is perpendicular to the screen.
Figure 10:
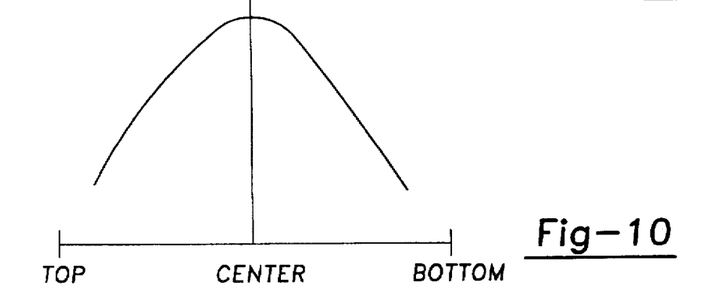
FIG. 10 illustrates the illumination field of the physical location illustrated in FIG. 9.

Other positions of projector 54 and image sensing device 62 will provide different errors due to the other sources of illumination non-uniformity. When the projector is positioned above the center of the screen 58 and the image sensing device 62 is positioned below the center of the screen 58, as illustrated in FIG. 9, the illumination of the screen 58 will appear as illustrated in FIG. 10.

As can be appreciated, illumination uniformity of the projector 54 will vary for any given application. By measuring the displayed image on the screen using the illumination uniformity measuring device 50, a "perfect" LCLV can be approximated by using the stored optimum illumination values, determined using the illumination uniformity measuring procedures, for each sensor pixel. Because the optimum illumination values are used, any difference in the illumination is a result of the other sources of illumination non-uniformity such as projection lens roll-off, projection angle relative to the screen, screen gain, etc. (without the effect of the LCLV illumination non-uniformity).

When the LCLV projector is used in a normal mode, these other sources of illumination non-uniformity are subtracted or divided out. The non-uniformity due to the LCLV light transfer function can then be determined. For example, a medium-level illumination value for blue light can be projected. Image sensing device 62 measures the relative illumination values from which appropriate correction can be made for the LCLV light transfer function. The other LCLV can then be measured. The light transfer function for the resulting data is purely a function of the LCLV non-uniformity. This allows for the correction of the LCLV non-uniformity, solely, without correcting the other sources of illumination non-uniformity.

Once error data for the other sources of illumination non-uniformity has been obtained and corrected, the non-uniformity data can be smoothed for use in a servo system to correct for the LCLV illumination non-uniformity. The error data may be pixellated and may require a two-dimensional filter for data smoothing. For a three color LCLV projector system, each channel will have its own measured illumination non-uniformity data. Preferably the data from the three LCLVs should be normalized and averaged into a common function to prevent artificial introduction of color shading errors.

As can be appreciated, the illumination uniformity measuring device according to the invention eliminates problems associated with the use of mirrors. The illumination uniformity measuring device eliminates the requirement that the projector be taken out of service to install the mirror. The illumination uniformity measuring procedure is not prone to measurement errors such as those which occur when conventional mirrors are installed improperly. The illumination uniformity measuring procedure can also be performed quickly.

In view of the foregoing, it can be appreciated that the present invention enables a user to determine the LCLV illumination non-uniformity of a LCLV projector. While this invention has been described in connection with a particular example thereof, no limitation is intended thereby except as defined by the following claims. This is because the skilled practitioner will realize that other modifications can be made without departing from the spirit of this invention after studying the specification, the drawings, and the foregoing claims.

What is claimed is:

1. A method of measuring the illumination uniformity of a liquid crystal light valve (LCLV) of a projector, comprising the steps of:

a) reflecting light from said LCLV to form an image on a screen;

b) sensing an illumination value for each of a plurality of portions of said image using an image sensing device;

c) comparing the sensed illumination value with a previously sensed illumination value for said each of a plurality of portions of said image to determine if an optimum illumination value has been reached; and d) adjusting an LCLV driver, based on the step of comparing the sensed illumination value with a previously sensed illumination value, until an optimum illumination value is reached for each of said plurality of portions of said image.

2. The method of claim 1 further comprising the step of:

e) repeating steps a) through d) for a plurality of LCLVs each associated with a distinct color of light.

3. The method of claim 1 wherein step d) comprises the steps of:

incrementing an LCLV driver voltage bias value;

measuring a new illumination value for said incremented LCLV driver voltage bias level;

comparing said new illumination value to said old illumination value; and setting said old illumination value equal to said new illumination value if said new illumination value exceeds said old illumination value.

4. The method of claim 3 wherein step d) further comprises repeating the steps recited in claim 4 for each remaining portion of said image.

5. A system for measuring the illumination uniformity of a liquid crystal light valve (LCLV) for a LCLV projector, comprising:

projection means, including a first LCLV, for reflecting light from said first LCLV to form an image on a screen, said projection means further including an LCLV driver that drives said LCLV;

image sensing means for sensing an illumination value, controlled by said LCLV driver, for a plurality of portions of said image; and processing means, coupled to said image sensing means and said projection means, for determining when said image sensing means senses an optimum LCLV driver level which provides a maximum illumination for said plurality of portions of said image.

6. The system of claim 5 further comprising:

pointing means, associated with said processing means, for sequentially selecting each of said plurality of portions of said image.

7. The system of claim 5 wherein said projector includes a plurality of LCLVs each associated with a distinct color of light.

8. The system of claim 7 further comprising:

LCLV pointing means, associated with said processing means, for sequentially identifying each of said plurality of LCLVs.

9. The system of claim 5 further comprising:

voltage setting means for successively incrementing a voltage bias level on said first LCLV, wherein said image sensing means measures a new illumination value corresponding to said incremented voltage bias level.

10. The system of claim 9 wherein said processing means includes optimum locating means for identifying, for each portion of said image, a maximum illumination value.

11. The system of claim 5 wherein said image sensing means includes a charge coupled device camera directed at said screen.

12. A system for measuring the illumination uniformity of a liquid crystal light valve (LCLV) for a LCLV projector comprising:

projection means, including a first LCLV, for projecting light which is modulated by said first LCLV to produce an image on a screen, the light having an illumination value corresponding to a projection means voltage bias level;

image sensing means for sensing an illumination value for a plurality of portions of said image; and at least one processor, coupled to said image sensing means and said projection means, that identifies a maximum illumination value sensed by said image sensing means for at least one of said plurality of portions of said image through successive comparison, via a negative feedback loop, of a present illumination value with a previously measured illumination value as said voltage vias level is increased in predetermined increments up to an optimum voltage bias level.

13. The system of claim 12 further comprising:

pointing means, associated with said control means and said at least one processor, for sequentially selecting each of said plurality of portions of said image.

14. The system of claim 12 wherein said projector includes a plurality of LCLVs each associated with a distinct color of light.

15. The system of claim 14 further comprising:

LCLV pointing means, associated with said control means and said at least one processor, for sequentially selecting each of said plurality of LCLVs.

16. The system of claim 12 further comprising:

voltage setting means, associated with said control means and said processor, for successively incrementing the projection means voltage bias level, wherein said image sensing means measures an illumination value corresponding to said voltage bias level.

17. The method of claim 1, further comprising the step of storing the optimum LCLV driver level for each of said plurality of portions of said image for overall LCLV level adjustment purposes.

18. The system of claim 5, wherein the LCLV driver level comprises an LCLV voltage bias level.

19. The method of claim 1, wherein said step of adjusting the LCLV driver comprises the steps of:

successively comparing a present illumination value with a previous illumination value as said driver level is increased in predetermined increments up to an optimum driver level; and ending the successive comparisons of the present illumination values and the previous illumination values, and storing the previous illumination value for each of the plurality of portions of said image, when the sensed present illumination value is less than the previous illumination value, thereby indicating that the optimum illumination value has been achieved.

20. A system for measuring the illumination uniformity of a liquid crystal light valve (LCLV) for a LCLV projector comprising:

a projector, including an LCLV, that projects, at a predetermined level, light which is modulated by said LCLV to produce an image on a screen;

an image sensor that senses an illumination value for a plurality of portions of said image; and at least one processor, coupled to said image sensor and said projector, that identifies a maximum illumination value sensed by said image sensor for at least one of said plurality of portions of said image through successive comparison of a present illumination value with a previous illumination value as said projector level is increased in predetermined increments up to an optimum projector level, said processor ending the successive comparisons of the present illumination values and the previous illumination values, and storing the previous illumination value for each of the plurality of portions, when the sensed present illumination value is less than the previous illumination value, thereby indicating that the optimum illumination value has been achieved.

21. The system of claim 20, wherein said projector includes an LCLV driver that drives said LCLV at an LCLV voltage bias level.

22. The system of claim 21, wherein said processor increases the LCLV voltage bias level to increase the sensed illumination value during the successive comparison of a present illumination value with a previous illumination value.

23. The system of claim 20, wherein the processor senses and stores optimum driver level data for each image portion, and subsequently utilizes the stored data to determine an optimum overall driver level for the LCLV.

24. The system of claim 23, wherein the processor senses and stores optimum driver level data for each image portion of a plurality of LCLVs, and subsequently utilizes the stored data to determine an optimum overall driver level for each of the LCLVs.

* * * * *